United States Patent [19]

Takamoro

[11] Patent Number: 5,726,555
[45] Date of Patent: Mar. 10, 1998

[54] BATTERY CHARGER CAPABLE OF DISPLAYING NECESSARY CHARGING TIME

[75] Inventor: Kenji Takamoro, Tokyo, Japan

[73] Assignee: NEC Corporation, Japan

[21] Appl. No.: 608,126

[22] Filed: Feb. 28, 1996

[30] Foreign Application Priority Data

Feb. 28, 1995 [JP] Japan .................. 7-064966

[51] Int. Cl.$^6$ .................. H01M 10/46; H01M 10/48
[52] U.S. Cl. .................. 320/43; 320/48
[58] Field of Search .................. 320/5, 20, 21, 320/22, 30, 31, 32, 39, 40, 48

[56] References Cited

U.S. PATENT DOCUMENTS

| | | | |
|---|---|---|---|
| 4,388,582 | 6/1983 | Saar et al. | 320/20 |
| 4,392,101 | 7/1983 | Saar et al. | 320/20 |

FOREIGN PATENT DOCUMENTS

| | | |
|---|---|---|
| 5841 | 12/1979 | European Pat. Off. . |
| 432690 | 6/1991 | European Pat. Off. . |
| 600234 | 6/1994 | European Pat. Off. . |

*Primary Examiner*—Edward Tso
*Attorney, Agent, or Firm*—Ostrolenk, Faber, Gerb & Soffen, LLP

[57] ABSTRACT

In a battery charger for use in charging a secondary battery, a display unit displays a necessary charging time which is left until completion of charging operation. The battery charger adopts a constant-voltage and constant current control method. A memory memorizes charging voltage and charging current characteristics of the secondary battery. A voltage detecting circuit detects a charging voltage of the secondary battery and produces a detected voltage signal. A current detecting circuit detects a charging current of the secondary battery and produces a detected current signal. A control circuit decides the necessary charging time on the basis of the charging voltage and charging current characteristics, the detected voltage signal, and the detected current signal. The necessary charging time is displayed on the display unit in the form of numerals and the like.

6 Claims, 5 Drawing Sheets

BATTERY CHARGER CAPABLE OF DISPLAYING NECESSARY CHARGING TIME

BACKGROUND OF THE INVENTION

This invention relates to a battery charger for charging a secondary battery, such as a lithium ion battery.

Generally, a nickel-cadmium (Ni—Cd) battery is well known as a secondary battery for a power source of a portable or handy electric device, such as a video camera, a laptop computer, and can be recharged by a battery charger. Herein, it is to be noted that the secondary battery, such as a Ni—Cd battery, is refreshed once at the beginning of the charging operation and is thereafter charged to a predetermined value. Accordingly, the battery charger detects completion of a charging or recharging operation by monitoring a charging time or a charging voltage.

Lately, a lithium ion battery has also been developed as the secondary battery and has been given attention. This is because the lithium ion battery is free from harmful materials, such as cadmium, and has a dense energy density in comparison with the Ni—Cd battery. Moreover, the lithium ion battery does not need to be refreshed before charging because the lithium ion battery does not have a memory effect.

A conventional battery charger for charging or recharging the lithium ion battery adopts a constant-voltage and constant-current control method which is generally unsuitable for the Ni—Cd battery.

More specifically, the conventional battery charger mentioned above has an indicator which is lightened at the start of the charging operation and which is darkened or changed in color on the completion of the charging operation. The indicator is usually implemented by a light emitting diode (LED) or LED's.

At any rate, the indicator indicates the completion of the charging operation after a predetermined time or duration lapses from the start. In other words, the conventional battery charger for the lithium ion battery also monitors a charging time to indicate the completion of the charging operation.

Herein, it is to be noted that the charging time is practically variable in the lithium ion battery in dependency upon an amount of electricity, namely, a quantity of electricity remaining in the lithium ion battery. This is because no refresh operation is necessary in the lithium ion battery.

Under the circumstances, it often happens that the lithium ion battery is excessively charged, which results in deterioration of the lithium ion battery. In addition, such an excessive charging operation might give rise to breakage of the conventional battery charger for the lithium ion battery.

Accordingly, it is necessary in the conventional battery charger to indicate or display a necessary charging time which is left until completion of the charging operation.

On the other hand, no indication is also made in the battery charger for the Ni—Cd battery about displaying such a necessary charging time which is left until the Ni Cd battery is completely charged or recharged.

SUMMARY OF THE INVENTION

It is an object of this invention to provide a battery charger which is capable of displaying a necessary charging time which is left until a secondary battery is completely charged or recharged.

It is another object of this invention to provide a battery charger of the type described, which is applicable to both a lithium ion battery and a Ni—Cd battery.

It is a specific object of this invention to provide a battery charger which is very helpful for the lithium ion battery.

It is still another object of this invention to provide a method of displaying the necessary charging time on charging or recharging the secondary battery.

According to an aspect of this invention, a battery charger is for use in charging a secondary battery which has two terminals. The battery charger has a current supplying circuit for supplying a predetermined current between the two terminals. A voltage supplying circuit supplies a predetermined voltage between the two terminals. A memory memorizes charging voltage and charging current characteristics of the secondary battery. A voltage detecting circuit detects a charging voltage between the two terminals to produce a detected voltage signal which is representative of the charging voltage. A current detecting circuit detects a charging current between the two terminals to produce a detected current signal which is representative of the charging current. A control circuit is connected to the memory, the voltage detecting circuit, and the current detecting circuit to decide a necessary charging time by the basis of the charging voltage and charging current characteristics, the detected voltage signal, and the detected current signal. A display unit is connected to the control circuit to display the necessary charging time.

DESCRIPTION OF THE PREFERRED EMBODIMENT

Figure 1:
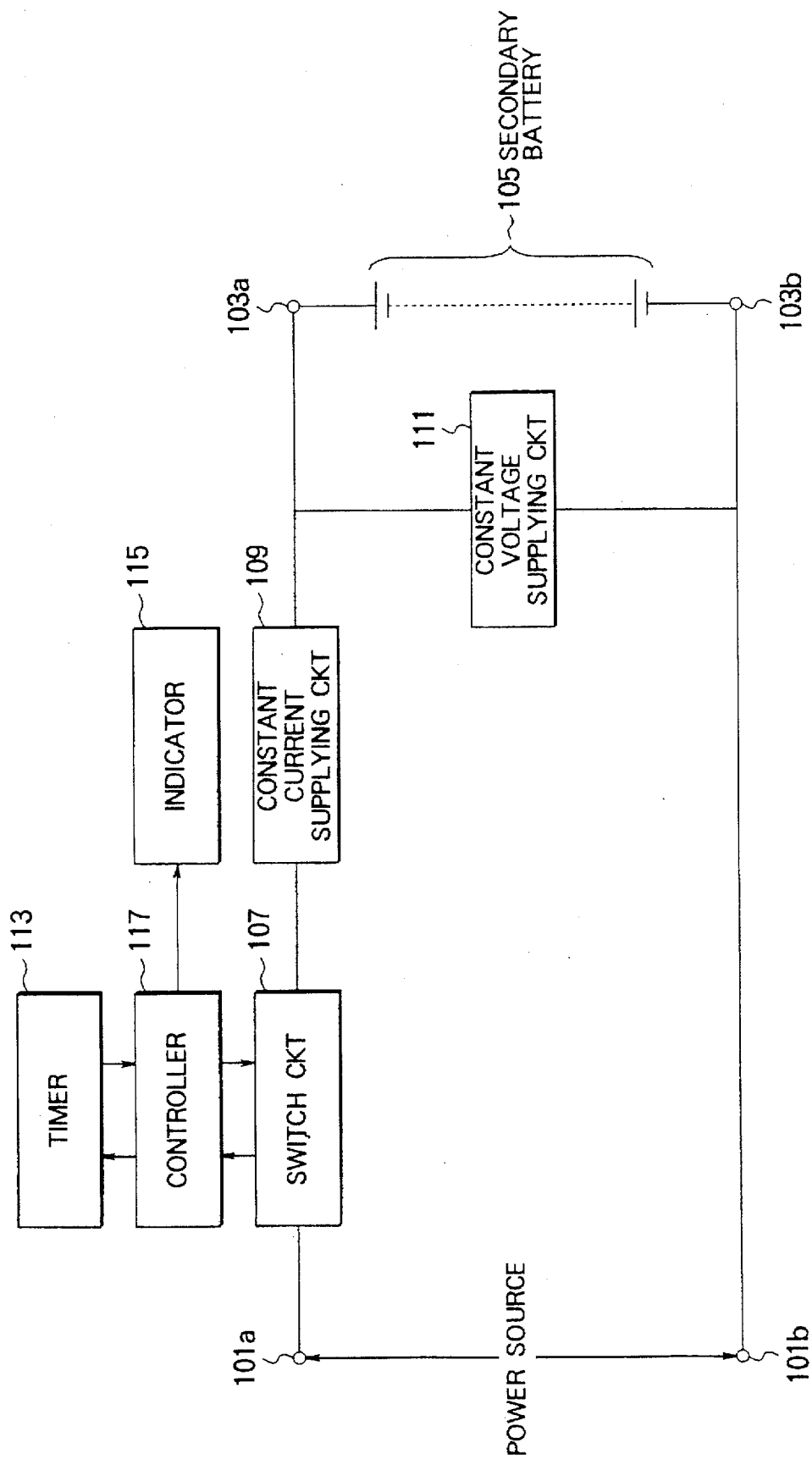
FIG. 1 is a block diagram of a conventional battery charger.

Referring to FIG. 1, description will be directed to a conventional battery charger which adopts a constant-voltage and constant-current control method to charge a secondary battery 105 which is assumed to be a lithium ion battery.

The conventional battery charger has a pair of input terminals 101a and 101b to be connected to a power source (not shown) and a pair of output terminals 103a and 103b to be connected to a secondary battery 105. The input terminal 101b and the output terminal 103b are connected in common to each other. A switching circuit 107 is connected to the input terminal 101a. A constant-current supplying circuit 109 is connected between the switching circuit 107 and the output terminal 103a for supplying a predetermined current to the secondary battery 105 through the output terminal 103a. A constant-voltage supplying circuit 111 is connected between the output terminals 103a and 103b to develop a predetermined voltage across the output terminals 103a and 103b. A timer 113 measures a predetermined time. An indicator 115, such as a light emitting diode (LED), indicates a start and a finish of the charge. A controller 117 is connected to the switch circuit 107, the timer 113, and the indicator 115 for controlling the switch circuit 107, the timer 113, and the indicator 115.

Now, the power source is connected between the input terminals 101a and 101b and the secondary battery 105 is connected to the output terminals 103a and 103b. A charging current flows between the input terminals 101a and 101b through the switching circuit 107, the constant current supplying circuit 109, and the secondary battery 105. A level of the charging current is decided by the constant-current supplying circuit 109, the constant-voltage supplying circuit 111, and a quantity of electricity remaining in the secondary battery 105. Similarly, a level of a charging voltage is also decided by the constant-current supplying circuit 109, the constant-voltage supplying circuit 111, and the quantity of electricity remnant in the secondary battery 105.

The switching circuit 107 detects the charging current and supplies a detected signal for the controller 117. The controller 117 makes the timer 113 operate when the detected signal is received from the switching circuit 107. At the same time, the indicator 115 is lightened to indicate the beginning and continuation of the charging operation under control of the controller 117. For example, the indicator 115 turns a green LED (not shown) in an on-state. The timer 113 measures a predetermined time and supplies a charging completion signal for the controller 117 when the predetermined time lapses. The controller 117 turns off the switch circuit 107 in response to the charging completion signal. Simultaneously, the controller 117 makes the indicator 115 indicate a completion of the charge. For example, the indicator 115 turns off the green LED or turns on a red LED (not shown).

As mentioned above, the indicator 115 indicates merely the continuation and the completion of the charging operation in the conventional battery charger. As a result, a user can not known a necessary charging time which is left or spared to completely charge the secondary battery. Therefore, the conventional battery charger has shortcomings as mentioned in the preamble of the instant specification.

On the other hand, there is another conventional battery charger having a temperature sensor which senses heat which might occurs from the secondary battery on completion of the charging operation. The temperature sensor produces a charging completion signal by sensing the heat. The temperature sensor may be thermally changed in color.

At any rate, the conventional battery charger also indicates merely the continuation and the completion of the charging operation.

Referring to FIGS. 2 through 5, a battery charger according to a preferred embodiment of this invention includes similar parts designated by like reference numerals. It is assumed that the lithium ion battery 105 is charged in the illustrated example like in FIG. 1.

Figure 2:
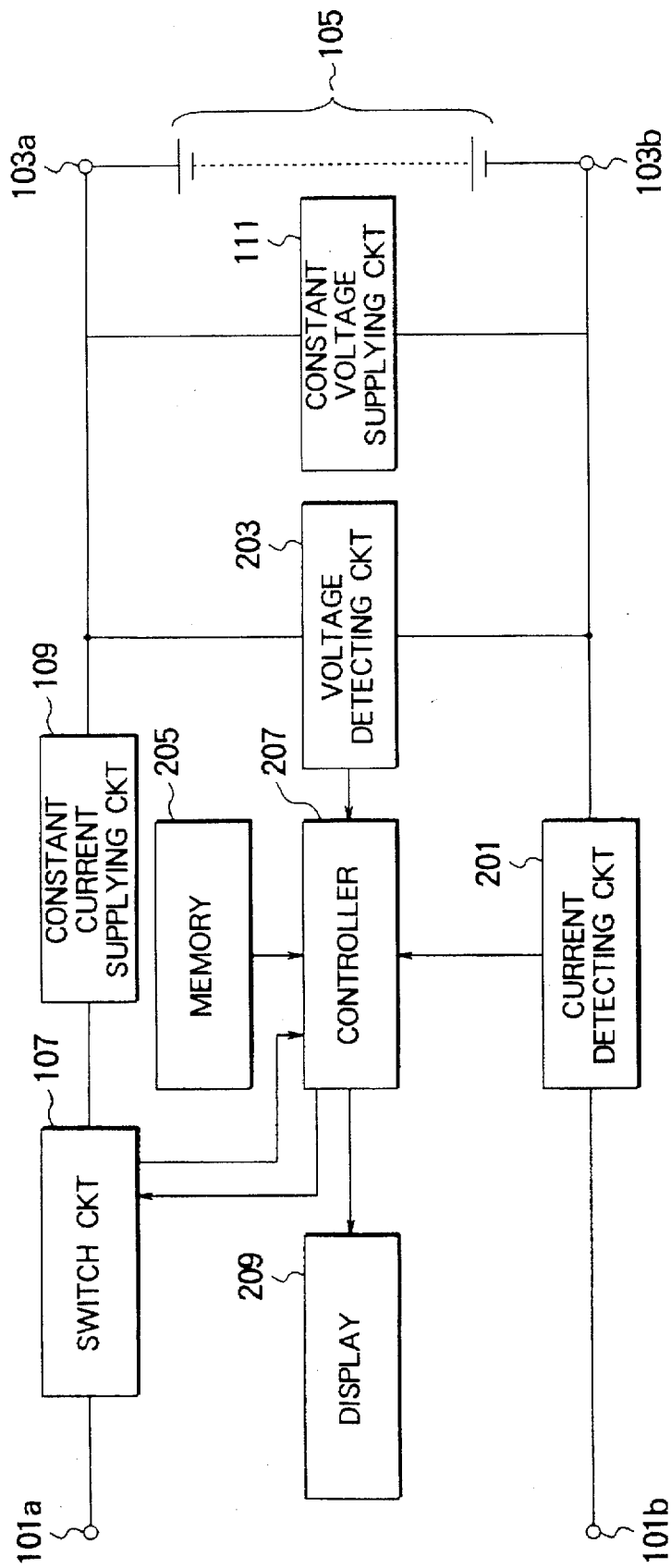
FIG. 2 is a block diagram of a battery charger according to a preferred embodiment of this invention.

In addition, the battery charger shown in FIG. 2 further comprises a current detecting circuit 201 which is connected to both the input terminal 101b and the output terminal 103b to detect the charging current and to produce a detected current signal which represents the charging current. A voltage detecting circuit 203 is connected across the output terminals 103a and 103b to detect the charging voltage and to produce a detected voltage signal which represents the charging voltage.

A memory 205 memorizes a plurality of charging voltage characteristics and a plurality of charging current characteristics. Each of the charging voltage characteristics represents a relationship between a charging voltage Vt and a charging time T while each of the charging current characteristics represents a relationship between a charging current It and the charging time T, as will become clear later. Such charging voltage and current may be collectively called electric value.

A controller 207 is connected to the current detecting circuit 201, the voltage detecting circuit 203, the memory 205, and the switch circuit 107 to control the switch circuit 107 on the basis of the detected current signal, the detected voltage signal, and the above-mentioned characteristics. A display 209, such as an LCD, is connected to the controller 207 instead of the indicator illustrated in FIG. 1 to display a necessary charging time which is given by the controller 207 and which is left and spared until completion of the lithium ion battery 105.

Figure 3A:
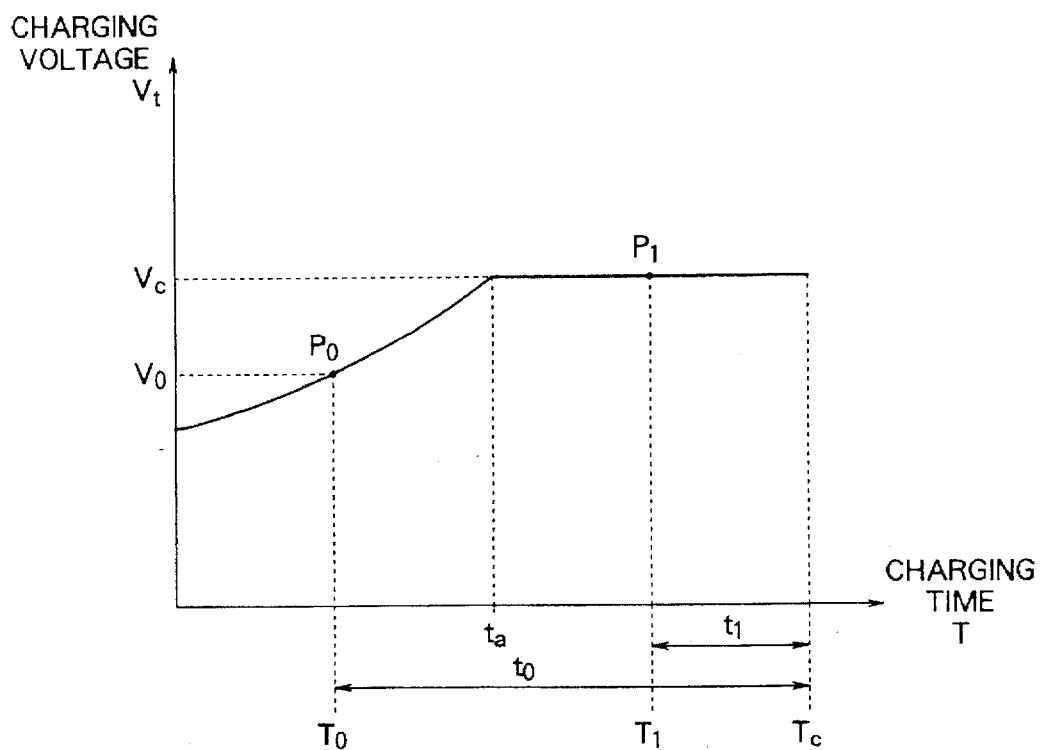
FIG. 3(A) is a graph representative of a relationship between a charging voltage and a charging time.
Figure 3B:
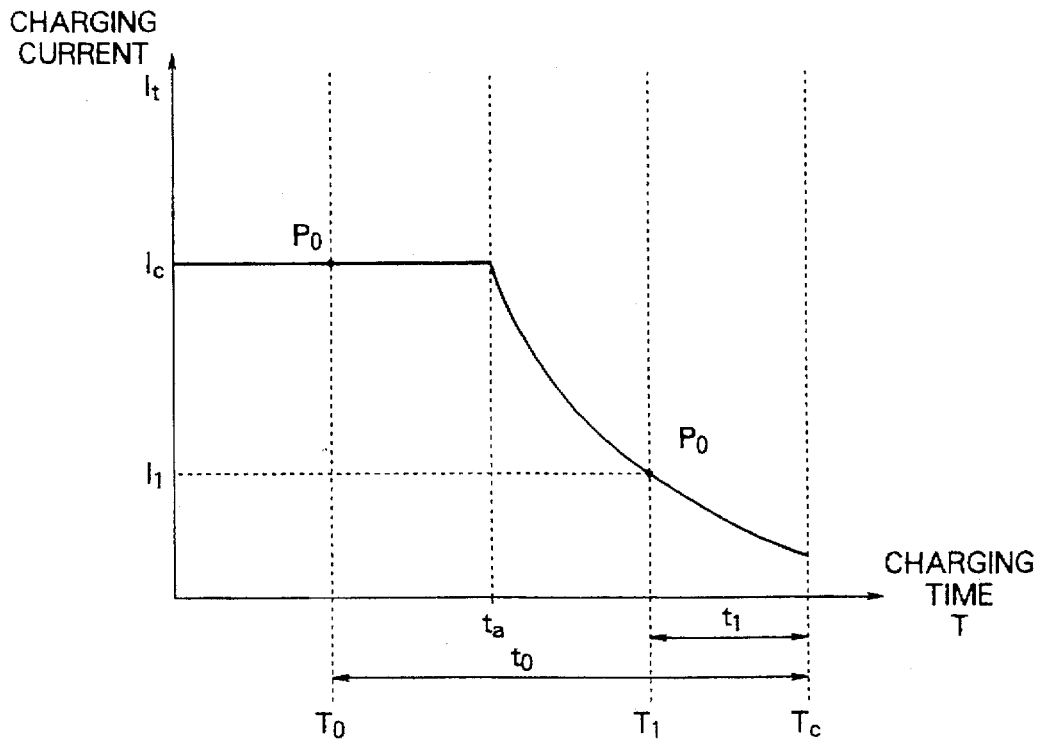
FIG. 3(B) is a graph representative of a relationship between a charging current and the charging time.

As mentioned above, the memory 205 memorizes the charging voltage and the charging current characteristics which represent the relationships of the lithium ion battery 105 between the charging voltage Vt and the charging time T and between the charging current It and the charging time T. In FIGS. 3(A) and 3(B), the charging voltage characteristic and the charging current characteristic are illustrated in connection with the lithium ion battery, respectively.

As shown in FIG. 3(A), the charging voltage Vt increases from the start of the charging operation with lapse of time, namely, the charging time T and is thereafter kept or saturated at a constant voltage Vc at a time point ta. The constant voltage Vc lasts at a time point Tc at which the charging operation is finished.

On the other hand, the charging current It illustrated in FIG. 3(B) is kept at a constant current Ic as long as the charging voltage Vt increases. When the charging voltage Vt is saturated at the time point ta, the charging current It gradually decreases with lapse of the charging time T until the time point Tc.

From this fact, it is readily understood that the charging voltage Vt is alternatively changed with the charging current It. This shows that the charging voltage Vt and the charging current It are changed with time in spite of the fact that the constant voltage Vc and the constant current Ic are to be given to the lithium ion battery 105 from the constant voltage supplying circuit 111 and the constant current supplying circuit 109, respectively. In this connection, the charging voltage Vt and the charging current It which are supplied from the constant voltage and the constant current supplying circuits 111 and 109 may be referred to as a controlled voltage and a controlled current, respectively.

Specifically, the charging voltage Vt and the charging current It change in dependency upon a quantity of electricity which remains or is stored in the lithium ion battery 105. Since the quantity of electricity can be considered as a function of a charging time T, the charging voltage Vt and the charging current It are varied with the charging time T in the manners illustrated in FIG. 3(A) and FIG. 3(B), respectively.

This shows that the charging time T can be specified by a selected one of the charging voltage Vt and the charging current It or by both the charging voltage Vt and the charging current It. For example, a time point T0 can be made to correspond to a voltage V0 because the charging voltage Vt is equal to V0 at the time point T0. At this time, the necessary charging time t0 is determined by a charging completion time Tc and the time point T0. Herein, the charging completion time Tc may be decided, for example, by monitoring a temperature of the lithium ion battery 105.

In other words, the charging completion time Tc can not be determined by monitoring only the charging voltage Vt because the charging voltage Vt is kept at the constant voltage Vc after the time point ta.

Taking this into consideration, the charging current It is also monitored together with the charging voltage Vt because the charging current It decreases with time after the time point ta. Practically, decision may be made as the charging completion time Tc when the charging current It becomes equal to a current level I1, as illustrated in FIG. 3(B).

Alternatively, it is readily understood from the above that the charging completion time Tc can be decided by monitoring only a decrease of the charging current It when the charging voltage Vt reaches the constant voltage Vc.

Anyway, the charging voltage characteristic and the charging current characteristic can be uniquely decided for the species of the lithium ion battery 105. Accordingly, the charging completion time Tc and the corresponding current level I1 can be set and memorized in the memory 205 when the species of the lithium ion battery 105 is determined.

For example, it is assumed that the lithium ion battery 105 to be changed exhibits a voltage V0 which corresponds to a point P0 on the charging voltage characteristic illustrated in FIG. 3(A).

The point P0 on the charging voltage characteristic corresponds to a time point T0. Therefore, the necessary charging time t0 can be given by calculating a difference between the charging completion time Tc and the charging time t0.

Likewise, when the lithium ion battery 105 exhibits a current I1 corresponding to a point P1 and a time T1 on the charging current characteristic illustrated in FIG. 3(B), the necessary charging time t1 can be given by calculating a difference between the charging completion time Tc and the time T1.

Figure 4:
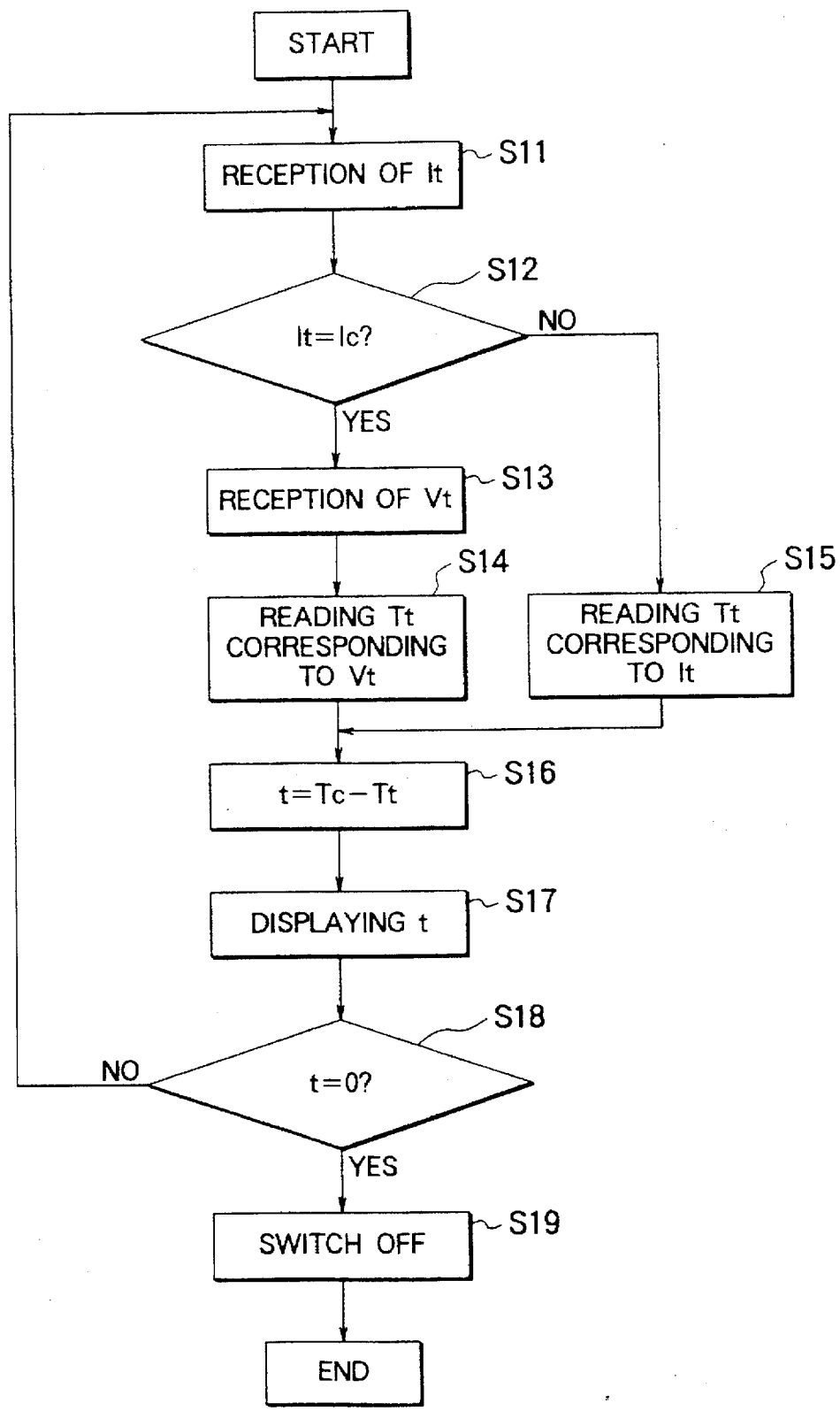
FIG. 4 is a flow chart for use in describing an operation of the battery charger shown in FIG. 2.

Referring to FIG. 4 with FIGS. 2 and 3, an operation of the battery charger will be described in detail later. The charging current It flows from the input terminal 101a to the input terminal 101b through the switch circuit 107, the constant current supplying circuit 109, the secondary battery 105, and the current detecting circuit 201 when the power source is connected between the input terminals 101a and 101b and the secondary battery 105 is connected to the output terminals 103a and 103b.

The current detecting circuit 201 detects the charging current It to produce the detecting current signal. The voltage detecting circuit 203 detects the charging voltage Vt to produce the detecting voltage signal.

The switch circuit 107 detects the charging current It and supplies the detecting signal to the controller 207. The controller 207 is put into an active state after reception of the detecting signal sent from the switch circuit 107.

Under the circumstances, the controller 207 is supplied with the detecting current signal from the current detecting circuit 201 at a step S11 shown in FIG. 4. Herein, the detecting current signal is representative of the charging current It.

Then, the controller 207 compares the charging current It represented by the detecting current signal with the controlled current Ic at a step S12. When the charging current It is equal to the controlled current Ic, the controller 207 receives the detecting voltage signal from the voltage detecting circuit 203 at a step S13. As shown at the step S13, the detecting voltage signal is representative of the charging voltage Vt and corresponds to a charging time Tt. At a step S14, the controller 107 reads the charging time Tt out of the memory 205 in response to the detecting voltage signal. When the charging current It is not equal to the controlled current Ic at the step S12, the controller 207 reads out of the memory 205, a charging time Tt which corresponds to the charging current Tt at a step S15.

Next, the controller 207 calculates a necessary charging time t by using the charging completion time Tc and the charging time Tt at a step S16. Then, the controller 207 make the display 209 display the necessary charging time t at a step S17.

The controller 207 judges at a step S18 whether the necessary charging time t becomes equal to zero, the controller 207 controls the switch circuit 107 to stop charging the secondary battery 105 at a step S19. As long as the necessary charging time t is not equal to zero, the controller 207 repeats the step S11 through the step S18.

As mentioned above, the battery charger can visually display the necessary charging time t on the display 209. Herein, the necessary charging time t may be displayed, for example, in the form of a combination of numerals and signs.

Figure 5:
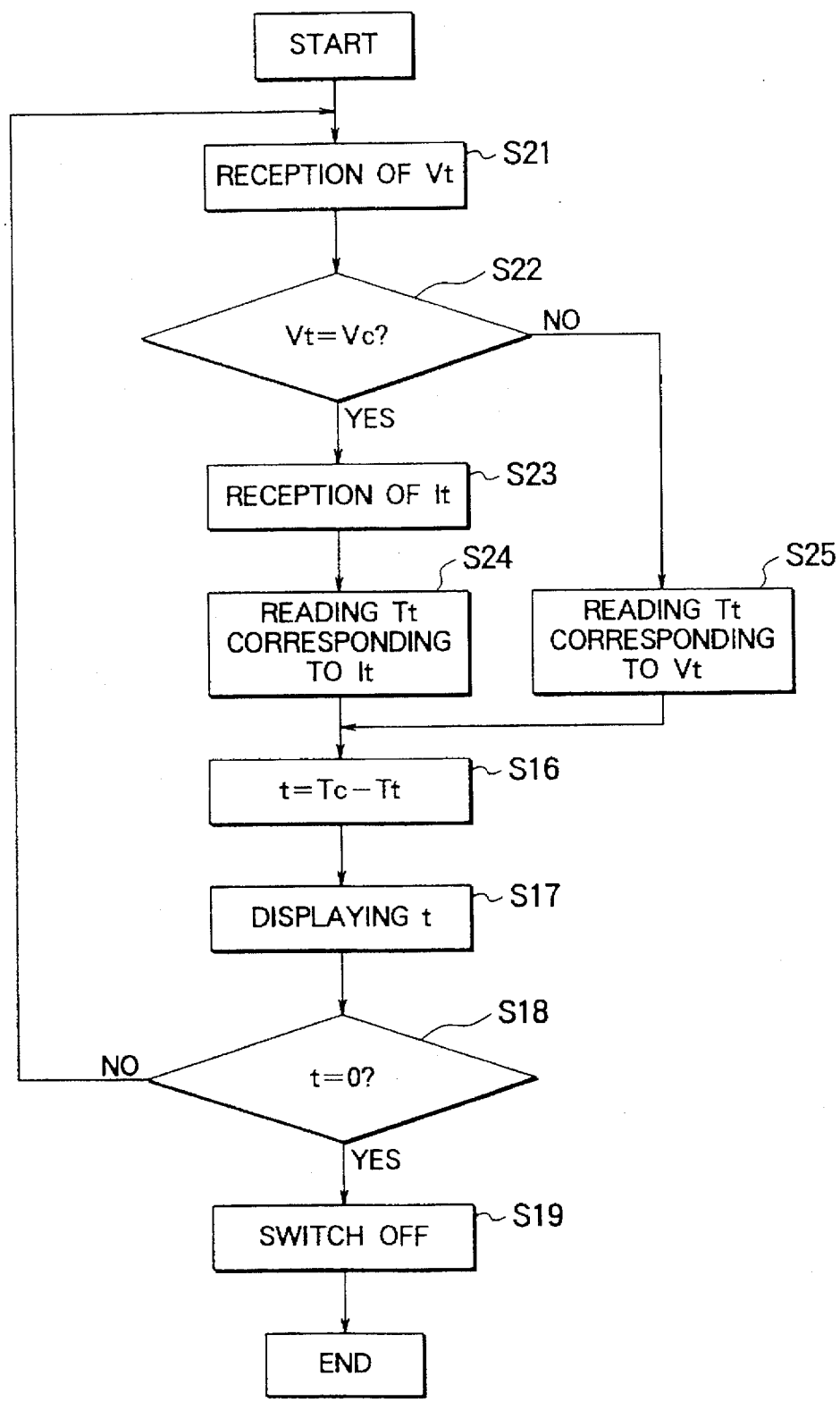
FIG. 5 is a flow chart for use in describing another operation of the battery charger shown in FIG. 2.

Referring to FIG. 5, description will be made about calculating a necessary charging time of the lithium ion battery 105. In FIG. 5, steps S21 and S23 are substituted for the steps S11 and S13 illustrated in FIG. 4, respectively. In other words, the charging voltage Vt is at first received by the controller 207 from the voltage detecting circuit 203 at the step S21 in FIG. 5 and the charging current It is thereafter received at the step S23 in FIG. 5.

In this connection, the constant voltage Vc is compared with the charging voltage Vt at a step S22 followed by the step S23. In addition, the charging time Tt is read out of the memory 205 at a step S25 in response to the charging voltage Vt when the charging voltage Vt is not equal to the constant voltage Vc.

Furthermore, the charging time Tt is read out of the memory 205 at a step S24 in response to the charging current It when the charging voltage Vt is equal to the constant voltage Vc.

The remaining operations are similar to those illustrated in FIG. 4 and will not be described any longer.

While this invention has thus for been described in conjunction with several embodiments thereof, it will readily be possible for those skilled in the art to put this invention into practice in various other manners.

For example, the memory 205 may memorize a plurality of characteristics which correspond to various types of the secondary batteries. In this case, the controller 207 must select pertinent characteristics to the secondary battery which is connected to the output terminals 103a and 103b. In addition, the controller 207 controls the constant current supplying circuit 109 and the constant voltage supplying circuit 111 to change the constant current Ic and the constant voltage Vc. The selection of the characteristics is carried out either by a user or by a discrimination signal which is supplied from a discrimination unit. The discrimination unit discriminates the type of the secondary battery which is located between the output terminals 103a and 103b. For example, the discrimination unit supplies a predetermined voltage to a resistor which determined for the type of the secondary battery. Thus, the type of the secondary battery can be indicated by a resistance of the resistor. The memory 205 may memorize characteristics representative of relationships between the charging voltage and the necessary charging time and between the charging current and the necessary charging time.

What is claimed is:

1. A battery charger for use in charging a secondary battery which has two terminals, said battery charger having a current supplying circuit for supplying a predetermined current between said two terminals, a voltage supplying circuit for supplying a predetermined voltage between said two terminals, said battery charger comprising:

a memory for memorizing charging voltage and charging current characteristics of said secondary battery, a voltage detecting circuit for detecting a charging voltage between said two terminals to produce a detected voltage signal which is representative of said charging voltage, a current detecting circuit for detecting a charging current between said two terminals to produce a detected current signal which is representative of said charging current, a control circuit connected to said memory, said voltage detecting circuit, and said current detecting circuit for deciding a necessary charging time on the basis of said charging voltage and charging current characteristics, said detected voltage signal, and said detected current signal, and a display unit connected to said control circuit for displaying said necessary charging time.

2. A battery charger as claimed in claim 1, wherein said memory has a plurality of memory areas for memorizing said charging voltage and charging current characteristics corresponding to a plurality of types of said secondary battery.

3. A battery charger as claimed in claim 2, wherein said battery charger further comprises a type detecting unit for detecting a type of said secondary battery.

4. A battery charger as claimed in claim 1, said control circuit producing a stop signal when said necessary charging time is equal to zero, wherein said battery charger further comprises a switch circuit for stopping supply of said charging current and said charging voltage for said two terminals.

5. A battery charger for use in charging a secondary battery which has a quantity of electricity, said battery charger comprising:

a detecting circuit for detecting the quantity of electricity as a detected electricity signal representative of the quantity of electricity;

a memory for memorizing a relationship between the detected electricity signal and a charging time;

a calculating circuit coupled to the detecting circuit and the memory for calculating a necessary charging time with reference to said relationship to produce a time signal representative of said necessary charging time; and a display unit for visually displaying said time signal said quantity of electricity is specified by both a voltage and a current.

6. A battery charger for use in charging a secondary battery which has a quantity of electricity, said battery charger comprising:

a detecting circuit for defecting the quantity of electricity as a detected electricity signal representative of the quantity of electricity;

a memory for memorizing a relationship between the detected electricity signal and a charging time;

a calculating circuit coupled to the detecting circuit and the memory for calculating a necessary charging time with reference to said relationship to produce a time signal representative of said necessary charging time; and a display unit for visually displaying said time signal said memory memorizing said relationship corresponding to the species of said secondary battery, and said battery charger further includes a deciding unit for deciding the species of said secondary battery as a decided species and a selecting means for selecting the relationship that corresponds to said decided species.

* * * * *